United States Patent
Kreski et al.

(10) Patent No.: US 11,105,973 B2
(45) Date of Patent: Aug. 31, 2021

(54) OPTICALLY ENHANCED HIGH RESOLUTION IMAGE GUIDES

(71) Applicant: SCHOTT Corporation, Elmsford, NY (US)

(72) Inventors: Patrick Kreski, Holliston, MA (US); Robert Duffy, Stafford Springs, CT (US)

(73) Assignee: SCHOTT Corporation

( * ) Notice: Subject to any disclaimer, the term of this patent is extended or adjusted under 35 U.S.C. 154(b) by 0 days.

(21) Appl. No.: 16/733,255

(22) Filed: Jan. 3, 2020

(65) Prior Publication Data
US 2020/0225409 A1    Jul. 16, 2020

Related U.S. Application Data (60) Provisional application No. 62/791,043, filed on Jan. 11, 2019.

(51) Int. Cl.
G02B 6/02  (2006.01)
G02B 6/06  (2006.01)

(52) U.S. Cl.
CPC ............ *G02B 6/06* (2013.01); *G02B 6/0229* (2013.01)

(58) Field of Classification Search
CPC ................................ G02B 6/06; G02B 6/0229
See application file for complete search history.

(56) References Cited

U.S. PATENT DOCUMENTS

| | | |
|---|---|---|
| 3,814,497 A | 6/1974 | Stone |
| 3,816,235 A | 6/1974 | Lin |
| 4,125,768 A | 11/1978 | Jackson et al. |
| 4,133,915 A | 1/1979 | Noethe et al. |
| 4,201,446 A | 5/1980 | Geddes et al. |
| 4,270,049 A | 5/1981 | Tanaka et al. |
| 4,373,768 A | 2/1983 | Clarke |
| 4,654,532 A | 3/1987 | Hirschfeld |
| 4,705,571 A | 11/1987 | Lange et al. |
| 4,710,353 A | 12/1987 | Tanaka et al. |
| 4,810,658 A | 3/1989 | Shanks et al. |
| 4,929,049 A | 5/1990 | Le Goullon et al. |
| 4,945,894 A | 8/1990 | Kawashima |
| 4,962,986 A | 10/1990 | Hompel et al. |
| 4,996,884 A | 3/1991 | Lessing |
| 5,361,320 A | 11/1994 | Liu et al. |
| 5,373,578 A | 12/1994 | Parker et al. |
| 5,461,691 A | 10/1995 | Schunck et al. |
| 5,570,447 A | 10/1996 | Liu |

(Continued)

FOREIGN PATENT DOCUMENTS

| | | |
|---|---|---|
| CN | 104732853 A | 6/2015 |
| DE | 3933159 A1 | 4/1990 |

(Continued)

OTHER PUBLICATIONS

Momentive performance materials—Product Data—Fine Particle Silicone Resin XC99-A8808.

(Continued)

*Primary Examiner* — Ryan A Lepisto (57) ABSTRACT

The present disclosure describes optically enhanced high resolution image guides having a high core to cladding area ratio with reduced spectral transmission loss and reduced cross talk while maintaining high resolution and high transmission.

32 Claims, 6 Drawing Sheets

(56) References Cited

U.S. PATENT DOCUMENTS

| | | |
|---|---|---|
| 5,619,600 A | 4/1997 | Pohl |
| 5,748,820 A | 5/1998 | Le Marer et al. |
| 5,793,046 A * | 8/1998 | Jeffers .................. G01T 1/20 250/364 |
| 5,881,200 A | 3/1999 | Burt |
| 5,932,149 A | 8/1999 | Schneider |
| 6,104,852 A | 8/2000 | Kashyap |
| 6,418,257 B1 | 7/2002 | Nath |
| 6,419,981 B1 | 7/2002 | Novich et al. |
| 6,468,428 B1 | 10/2002 | Nishii et al. |
| 6,507,688 B1 | 1/2003 | Nath |
| 6,519,401 B1 * | 2/2003 | Imamura ................ G02B 6/001 385/123 |
| 6,547,721 B1 | 4/2003 | Higuma et al. |
| 6,584,335 B1 | 6/2003 | Haar et al. |
| 8,553,223 B2 * | 10/2013 | McKenna .......... A61B 5/02427 356/319 |
| 9,366,796 B2 * | 6/2016 | Irie ..................... B60Q 3/64 |
| 9,507,083 B2 | 11/2016 | Miyata et al. |
| 9,587,201 B2 | 3/2017 | Tomsheck et al. |
| 9,701,576 B2 | 7/2017 | Bockmeyer et al. |
| 9,918,620 B2 | 3/2018 | Miyata et al. |
| 2003/0004412 A1 | 1/2003 | Izatt et al. |
| 2003/0159283 A1 | 8/2003 | White |
| 2003/0165313 A1 | 9/2003 | Broeng et al. |
| 2003/0185274 A1 | 10/2003 | Singh et al. |
| 2004/0120666 A1 | 6/2004 | Chalk et al. |
| 2005/0004329 A1 | 1/2005 | Thorman |
| 2005/0276556 A1 | 12/2005 | Williams et al. |
| 2007/0131688 A1 | 6/2007 | Beigel et al. |
| 2009/0067792 A1 | 3/2009 | Curdt et al. |
| 2010/0061684 A1 | 3/2010 | Terada et al. |
| 2010/0226614 A1 | 9/2010 | Quiquempois et al. |
| 2015/0011825 A1 | 1/2015 | Guy |
| 2016/0231505 A1 | 8/2016 | Miyata et al. |
| 2016/0270644 A1 | 9/2016 | Miyata et al. |
| 2020/0192040 A1 * | 6/2020 | Li .................. G02B 6/4403 |

FOREIGN PATENT DOCUMENTS

| | | |
|---|---|---|
| DE | 69923388 D1 | 3/2005 |
| DE | 102012015140 A1 | 10/2013 |
| EP | 0022220 A | 1/1981 |
| EP | 0402701 A | 12/1990 |
| EP | 1563784 A | 8/2005 |
| EP | 1742034 A | 1/2007 |
| EP | 1762182 A | 3/2007 |
| EP | 2436836 A | 4/2012 |
| EP | 2952947 A1 | 12/2015 |
| GB | 1471047 A | 4/1977 |
| JP | 54135544 A | 10/1979 |
| JP | 58098708 A | 6/1983 |
| JP | 61186836 A | 8/1986 |
| JP | 61250606 A | 11/1986 |
| JP | 11038237 A | 2/1999 |
| JP | 2000053158 A | 2/2000 |
| JP | 2000262461 A | 9/2000 |
| JP | 2009222429 A | 10/2009 |
| WO | 2004001465 A1 | 12/2003 |

OTHER PUBLICATIONS

Momentive performance materials—Technical Data—Fine Particle Silicone Resin XC99-A8808.

CBC (Europe) Ltd.—Data Sheet—SANWAX—VISCOL.

\* cited by examiner

OPTICALLY ENHANCED HIGH RESOLUTION IMAGE GUIDES

CROSS-REFERENCE TO RELATED APPLICATIONS

This patent application claims the priority of U.S. Patent Application No. 62/791,043 filed on Jan. 11, 2019, the contents of which are incorporated herein by reference.

BACKGROUND OF THE DISCLOSURE

1. Field of the Disclosure

The present disclosure describes optically enhanced image guides having a high core to cladding area ratio with high resolution, high spectral transmission, balanced spectral transmission and low cross talk.

2. Description of the Related Art

Image guides such as leached fiber bundles can transmit optical information, for example in endoscopes. Leached fiber bundles generally include a multiplicity of optical fibers which are arranged in a defined fashion. The diameter of the optical fibers can be less than 10 µm and is typically 0.5 to 8 µm to provide a high resolution image.

Processes for producing leached fiber bundles are known. To obtain an ordered fiber arrangement, leached fiber bundles can be produced by drawing correspondingly arranged fiber bundle preforms, for example glass rods or tubes, which can include spacers made from etchable glass, i.e. a glass which can be partially dissolved by treatment with acids, bases or deionized water. The spacers are generally in the form of tubes or rods. The distance between and arrangement of the individual optical fibers can be defined by the arrangement of the etchable spacers.

The leached fiber bundle preforms can be drawn under heat using known processes until the desired fiber or fiber bundle cross section is reached. In such processes, the spacers can be fused to the optical fibers and fill the space between the individual optical fibers. To produce an image guide, the ends of the fused fiber bundles can be provided with a protective layer which can be resistant to acids and/or lyes while the spacers can be removed by the acids and/or lyes. This permits the optical fibers to be uncovered or separated from the spacers to produce a flexible fiber bundle with ends that remain connected, rigid and fixed. The ends can be polished to increase the optical quality.

The image quality of image guides including leached fiber bundle systems for products including endoscopes can be improved using higher resolution image guides. To increase the resolution, the diameter of the fiber optical components is usually decreased, but a decreased optical cladding thickness usually increases light loss and increased cross talk between nearby optical fibers. The light loss lowers overall transmission and causes a visible tint to the image transmitted by the image guide and is usually initially observed with longer visible wavelengths (e.g. red) and continually impacts shorter visible wavelengths (e.g. orange, yellow, green, blue and violet) as the fiber diameter decreases. The increased cross talk degrades image fidelity as more and more light is lost from one fiber and transmitted to a nearby fiber.

Spectral transmission loss and cross talk can be reduced to some extent by decreasing the ratio of the fiber core to the fiber cladding (e.g. by increasing the thickness of the fiber cladding and/or by decreasing the diameter of the fiber core), but this lowers resolution (in the case of increased fiber cladding thickness for the same fiber core diameter) and lowers transmission (in the case of decreased fiber core diameter) and often fails to produce an acceptable product.

SUMMARY OF THE DISCLOSURE

Contrary to the expectation that light loss will increase and cross talk will increase when increasing the ratio of the fiber core to the fiber cladding, the image guides of the disclosure can have an increased ratio of the fiber core to the fiber cladding while maintaining high resolution and high transmission and without corresponding reductions in spectral transmission loss and cross talk. These benefits can be achieved using an image guide having a plurality of particles distributed between the optical fibers to physically separate one or more of the optical fibers and a cladding extending liquid applied to one or more of the optical fibers. The resulting image guides can have a transmittance of 25% or more at 550 nm, a transmittance variance of 15% or less from 450-700 nm, a resolution of 100 lp/mm or more, and/or a contrast value of 0.90 or more.

The optically enhanced high resolution image guides of the disclosure can comprise an optical fiber bundle comprising a plurality of optical fibers each having an image input end and an image output end. Each optical fiber can have a core, a cladding surrounding the core, and a multitude of optical fibers can be bundled within a surrounding protective sheath. The fiber bundles can have a plurality of particles distributed between the optical fibers to physically separate one or more of the optical fibers. The fiber bundles can have a cladding extending liquid applied to one or more of the optical fibers.

DETAILED DESCRIPTION OF THE DISCLOSURE

The present disclosure describes optically enhanced high resolution image guides, such as leached fiber bundles and wound fiber bundles used in endoscope systems for example, which may have an increased ratio of the fiber core to the fiber cladding and may not experience reduced spectral transmission loss and reduced cross talk while maintaining high resolution and high transmission. The image guides can have a transmittance of 25% or more at 550 nm, a transmittance variance of 15% or less from 450-700 nm, a resolution of 100 lp/mm or more, and/or a contrast value of 0.90 or more.

The optically enhanced high resolution image guides can comprise an optical fiber bundle comprising a plurality of optical fibers each having an image input end and an image output end. Each optical fiber can have a core, a cladding surrounding the core and a multitude of optical fibers can be bundled within a surrounding protective sheath.

A non-functional silane can be applied to the exterior of the cladding, possibly prior to application of the physical separation particles and the cladding extending liquid. The non-functional silane can provide the fibers with a hydrophobic surface and a lubricous surface. The hydrophobic nature repels water, which otherwise weakens glass in the presence of mechanical loading, thus it improves the fiber strength. The surface lubricity helps prevent abrasion between adjacent fibers.

The image guides can have a plurality of particles distributed between the optical fibers to physically separate one or more of the optical fibers. The particles physically separate all or some portions of the individual optical fibers and may reduce abrasion and friction between the individual optical fibers, and without being bound to any particular theory, the particles can also contribute to lower cross talk between individual optical fibers along the length of the image guide.

Figure 1A:
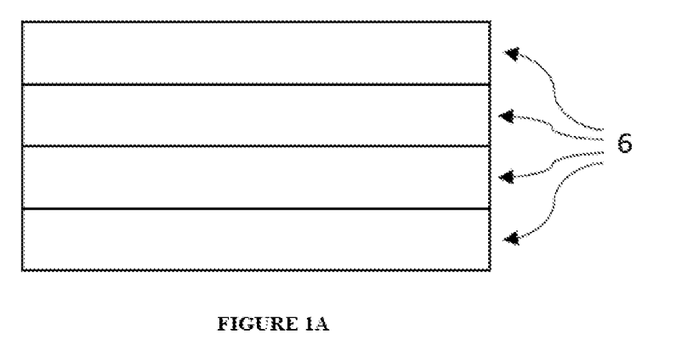
FIG. 1A shows a collection of four optical fibers without any separation particles.
Figure 1B:
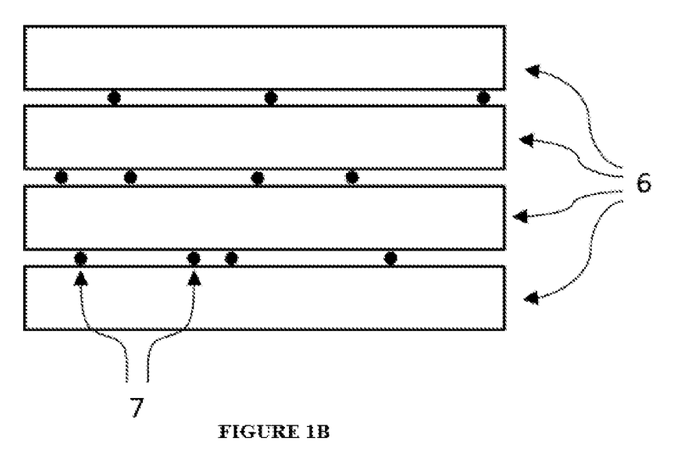
FIG. 1B shows a collection of four optical fibers with physical separation particles distributed between the optical fibers.

A fiber bundle with a collection of four optical fibers 6 without any separation particles is 20 shown in FIG. 1A. FIG. 1B shows a collection of four optical fibers 6 with physical separation particles 7 distributed between the optical fibers 6 to mitigate physical contact among the optical fibers 6 and possibly lowering cross talk between the optical fibers 6.

The physical separation particles in some embodiments can have a diameter of about 0.10-0.75 µm, about 0.5-0.7 µm or about 0.45-0.55 µm. The particles can have a hardness lower than the hardness of the glass fibers so that particles do not scratch or abrade the glass fiber. The particles can comprise any suitable particles that provide physical separation between the individual optical fibers, including but not limited to silicone resin particles, talcum powder, graphite, boron nitride, PTFE powder, or a combination thereof, each of which can be spherical or any other geometry. The silicone resin particles can comprise a methyl silsesquioxane for example.

The image guides can have a cladding extending liquid located between the optical fibers. The cladding extending liquid should have a refractive index equal to or lower than the refractive index of the fiber cladding to support total internal reflection. As the refractive index of the cladding extending liquid increases and approaches the refractive index of the cladding, the transmission may improve. Suitable transmission can be achieved when the refractive index of the cladding extending liquid is less than the refractive index of the cladding by 0.300 or less, 0.250 or less, 0.200 or less, 0.150 or less, 0.100 or less, 0.050 or less, 0.025 or less, at the intended wavelength for the end use of the image guide. The difference of refractive index between the core and the cladding determines the numerical aperture of the system, with a larger difference generating larger NA. A certain range of NA is desirable for coupling of the image guide to the input and output optics.

Figure 5:
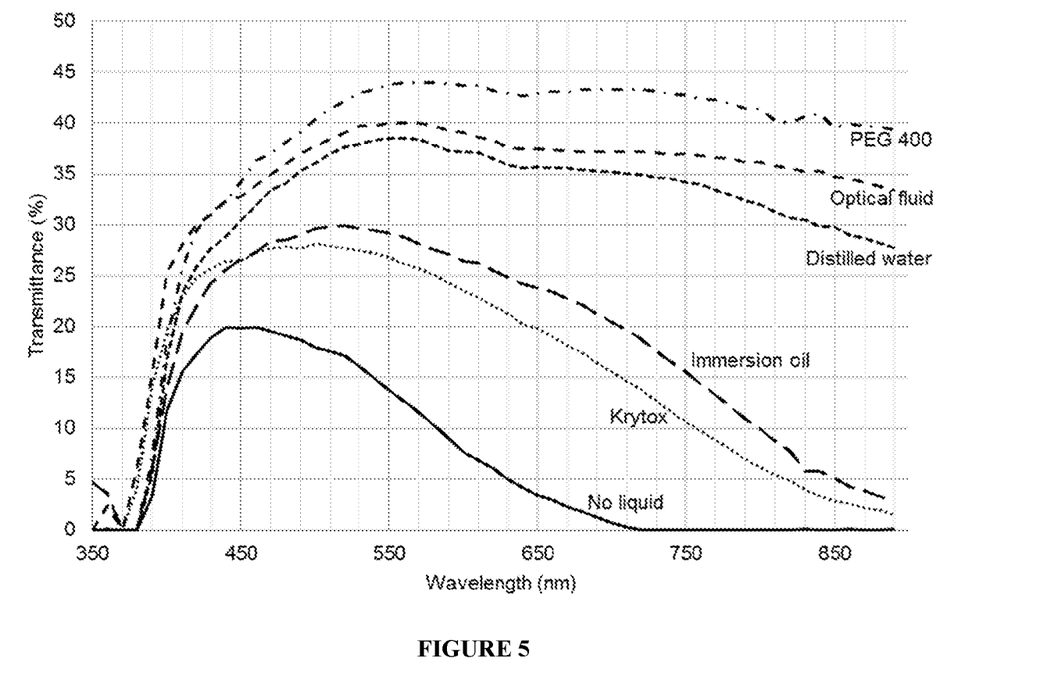
FIG. 5 shows the transmittance spectra for various cladding extending liquids.

Without being bound to any particular theory, the cladding extending liquid can extend the effective optical thickness of the fiber cladding thereby reducing spectral transmission losses. The cladding extending liquid should be substantially transmitting across the visible spectrum, i.e. it should have low absorption from 400 to 700 nm. If absorption is in this range, the cladding extending liquid will absorb rather than reflect the light lost from the optical fiber. Certain liquids, such as polyethylene glycol (PEG) and water, provide different transmittance spectra when applied to a fiber bundle as shown in FIG. 5. There may be other optical dispersion-related characteristics that have some bearing on the effectiveness of the cladding extending liquid.

The cladding extending liquid may have a preferred range of contact angles with the optical fiber cladding or silane-coated glass cladding. The contact angle is defined as the angle formed between the solid surface and a liquid droplet, as measured on the air-side of the air-liquid-solid interface. In some embodiments, the contact angle of the cladding extending liquid is 20 degrees or above, or 25 or above, 30 or above, 35 or above, or 40 degrees or above. The upper limit of the contact angle can be for example 110, 100 or 90 degrees.

The selection of the cladding extending liquid should consider temperature and environmental stability constraints. For example, some PEG formulations will solidify at moderate temperatures which could diminish or completely eliminate the benefits of the cladding extending liquid. Further, the cladding extending liquid should be stable for a long period of time to accommodate a reasonable shelf-life of the product and use in the field.

Refractive index is a function of wavelength. It is desirable for the refractive index of the cladding extending liquid to be less than or equal to the fiber cladding across all wavelengths from 400 to 700 nm. In some embodiments, the cladding extending liquid has a refractive index greater than 1.30 or greater than 1.45 at 589 nm, a boiling point greater than 200° C., and/or a log(viscosity) of less than 0.4. If the cladding extending liquid is provided in a diluent, the diluent should have refractive index of 1.38-1.45 at 589 nm, a boiling point of 70-200° C., and/or a log(viscosity) of 0.4-1.0.

The cladding extending liquid in some embodiments can comprise polyethylene glycol, cyclopropylmethylketone, diethyl phthalate, di-n-butyl sulfoxide, 3-methyl cyclohexanone, cyclobutanone dibutyl ketone, a perfluoropolyether such as Krytox, water with or without an additive that adjusts the refractive index and/or viscosity, an optical gel such as the optical coupling fluid OCF-446 available from Nye Lubricants Inc, an immersion oil such as a combination of a terphenyl with natural hydrocarbons, or a combination thereof.

The physical separation particles and the cladding extending liquid may be applied in the same mixture or consecutively to the claddings, but it could be advantageous in some embodiments to first apply the physical separation particles using a liquid carrier, then evaporate the carrier, then apply the cladding extending liquid. The sequential addition may be advantageous to account for property differences between the liquid carrier and the cladding extending liquid. The liquid carrier properties can be selected to ensure the physical separation particles are properly suspended, are uniformly distributed, and have proper distribution density. In some cases, the physical separation particles might not be able to adequately applied if the physical separation particles are in the same mixture as the cladding extending liquid. The physical separation particles may be completely or partially within the cladding extending liquid and/or may be near the cladding extending liquid for example when droplets or the cladding extending liquid are located on the fibers.

Figure 2A:
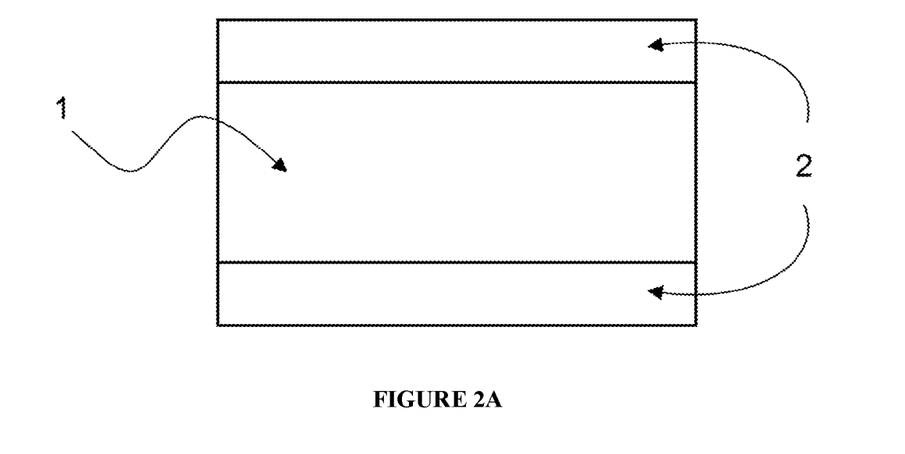
FIG. 2A shows an optical fiber having an optical fiber core and an optical fiber cladding.
Figure 2B:
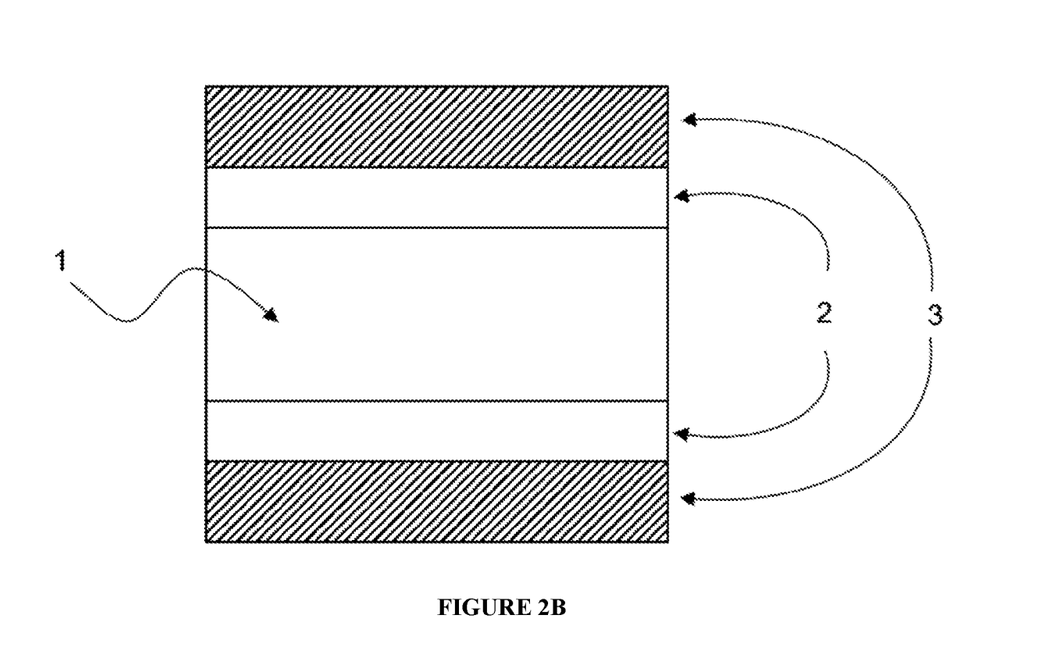
FIG. 2B shows a cladding extending liquid applied to an optical fiber cladding.
Figure 2C:
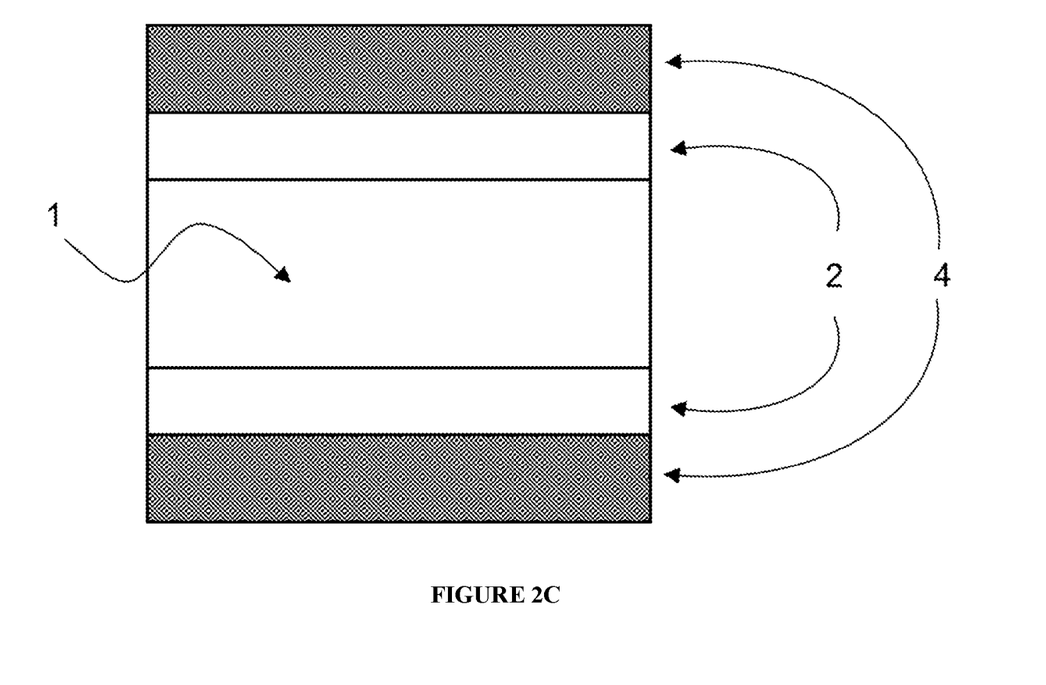
FIG. 2C shows a cladding extending liquid containing a dye applied to an optical fiber cladding.
Figure 3A:
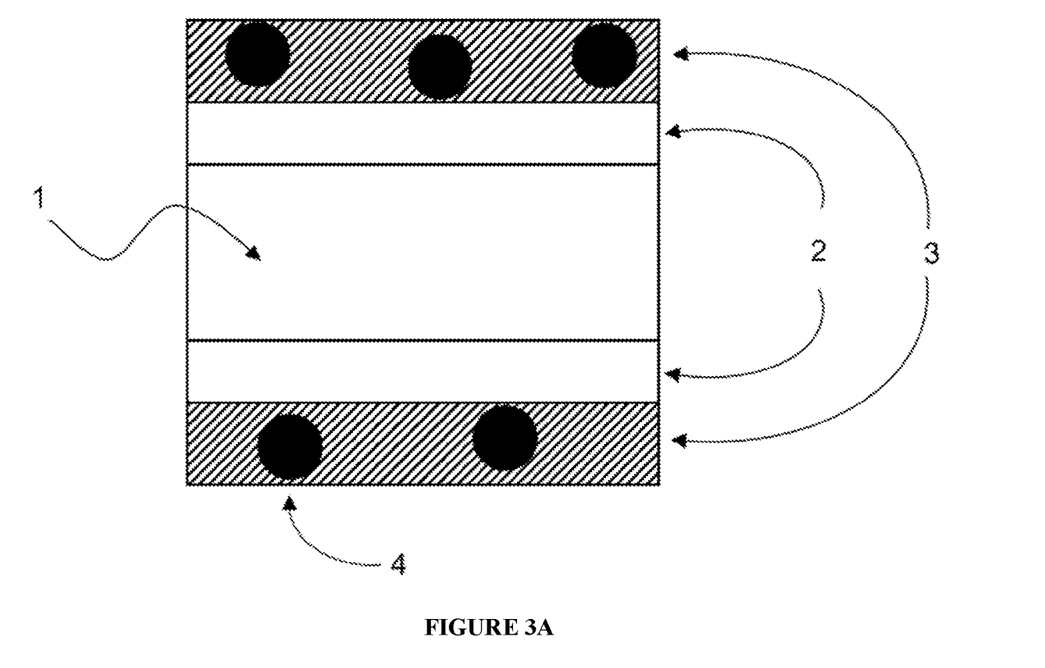
FIG. 3A shows an optical fiber having an optical fiber core and an optical fiber cladding with a cladding extending liquid applied to the optical fiber cladding and physical separation particles located within the cladding extending liquid to provide separation between adjacent optical fibers.
Figure 3B:
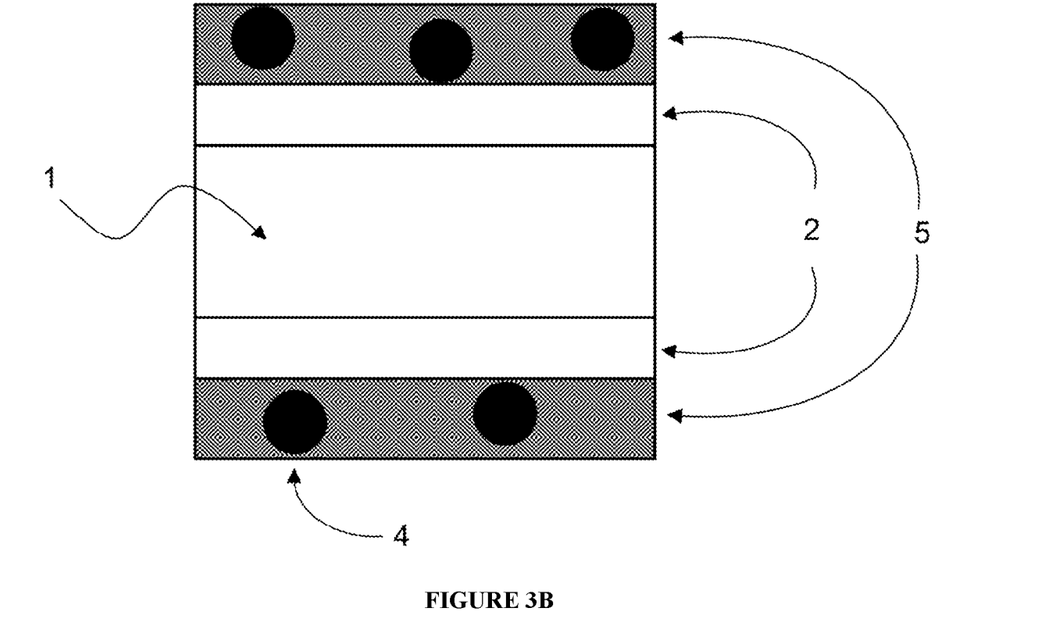
FIG. 3B shows a cladding extending liquid containing a dye applied to an optical fiber cladding.

FIG. 2A shows an optical fiber having optical fiber core 1 and an optical fiber cladding 2. FIG. 2B shows cladding extending liquid 3 applied to optical fiber cladding 2. FIG. 2C shows cladding extending liquid containing a dye 4 applied to optical fiber cladding 2. FIG. 3A shows an optical fiber having optical fiber core 1 and optical fiber cladding 2 with cladding extending liquid 3 applied to optical fiber cladding 2 and physical separation particles 4 located within the cladding extending liquid 3 to provide separation between adjacent optical fibers. FIG. 3B shows cladding extending liquid containing a dye 5 applied to optical fiber cladding 2.

The fiber bundles can also include a dye, which can be added to the cladding extending liquid. Without being bound to any particular theory, the dye can adjust the attenuation of specific portions of the optical transmission spectrum. This is sometimes beneficial since the cladding extending liquid used without a dye could produce suboptimal optical transmission. In addition, without being bound to any particular theory, the dye can attenuate cross talk that might not have been sufficiently reduced by the combination of the cladding extending liquid and the separation particles.

Each optical fiber can have a diameter of 10 µm or less or about 1-5 µm. The area ratio of the cross section of the core to the cross section of the cladding can be 20% or more, 30% or more, 40% or more, or 50% or more. In some embodiments, the ratio is 20-60%. For round optical fibers with a core and cladding, and no acid-soluble glass, the lower limit for light transmission at 400 nm for a fiber diameter of about 1 µm is about a 10% area ratio. For light transmission at 700 nm, the lower limit for a fiber diameter of about 2 µm is about a 10-20% area ratio. These limits may be extended.

Transmittance is the transmission without correction for surface reflections. To measure transmittance, a collimated light source from a monochromator is launched into the image guide, where the aperture of the launched light is completely contained within the imaging area of the image guide, and the light is collected at the opposite end of the image guide using an integrating sphere outfit with a detector. Prior to measuring image guide transmittance, a baseline measurement is made, where the light path is direct and close-coupled from the launch aperture to the entrance of the integrating sphere. This is used as a reference condition to establish 100% T for all wavelengths as the light source does not have uniform output for all wavelengths and the detector is also wavelength-sensitive. Transmittance is determined using a transmission bench (Optronic Laboratories, Inc. model OL 750-D monochromator) with a 0.4 mm diameter launch aperture and using air (no image guide in light path) as a baseline condition. The transmittance spectrum is collected from 400 to 700 nm at 10 nm increments. The light source is a tungsten lamp. The detector within the integrating sphere is silicon-type. The transmittance variance is the difference between the maximum transmittance and the minimum transmittance for all wavelengths over the range of 450-700 nm. For example, the transmittance variance in FIG. 4 from 450-700 nm is 7.5%, which is the difference between the 36.3% transmittance at 450 nm and the 43.8% transmittance at 700 nm. The image guides described herein can have a transmittance variance of 15% or less from 450-700 nm while simultaneously having a transmittance of 25% or more at 550 nm, a resolution of 100 lp/mm or more, and/or a contrast value of 0.90 or more.

Resolution is determined by placing one end of the image guide in direct contact with a backlit USAF 1951 target, centered on groups 6 and 7. The backlight is light from a white light LED light source (Moritex SCHOTT LLS 3) delivered to an opal glass diffuser via an illumination guide. The opal glass is close-coupled in contact with the backside of a chrome-on-glass USAF 1951 target. The opposite end of the image guide is observed with a microscope (Keyence VHX-5000) at total magnification of approximate 200×. The transmitted image is inspected for resolvable group/element pairs. The group/element is considered resolved if the bars were visually delineated by the backlit light. Note, there is some dependence on the orientation of the optical fiber array in the image guide relative to the target orientation on the ability to resolve the vertical and horizontal bars of the target. The image guides described herein can have a resolution of 100 lp/mm or more while simultaneously having a transmittance of 25% or more at 550 nm, a transmittance variance of 15% or less from 450-700 nm, and/or a contrast value of 0.90 or more.

The contrast value is measured using a backlit USAF 1951 target where a masked area and an adjacent transmitting area of equivalent spatial dimensions are used as the dark patch and the light patch, respectively. An image guide is placed in direct contact with this region of the USAF target, transmitting an image of this region to the opposite end of the image guide. A microscope equipped with a digital camera is used to capture a digital image of the image transmitted by the image guide. From the captured image, the average grayscale value in each patch is determined. An associated contrast metric is calculated as $CV=(g_w-g_b)/(g_w+g_b)$, where CV is the contrast value, $g_w$ is the average grayscale value in the light patch and $g_b$ is the average grayscale value in the dark patch. A contrast value of 0.0 indicates no contrast between the light patch and the dark patch and a contrast value of 1.0 indicates the best possible contrast between the light patch and the dark patch. Contrast is determined by placing one end of each image guide in direct contact with a backlit USAF 1951 target, centered on the group 4-group 5 reference indicator. The backlight is light from a white light LED light source (Moritex SCHOTT LLS 3) delivered to an opal glass diffuser via an illumination guide. The opal glass is close-coupled in contact with the backside of a chrome-on-glass USAF 1951 target. The opposite end of the image guide is observed using a microscope (Keyence VHX-5000) at approximately 200× total magnification with an attached digital camera. The camera is set to a fixed aperture and a fixed exposure time. At the beginning of the session, the backlight intensity is set to avoid washing out the dynamic range of the camera and this setting is held constant for all measurements. The image guides described herein have a contrast value of 0.90 or more while simultaneously having a transmittance of 25% or more at 550 nm, a transmittance variance of 15% or less from 450-700 nm, and/or a resolution of 100 lp/mm or more.

In some embodiments, the transmittance at 550 nm is 25% or more, 30% or more, 35% or more, 40% or more, 45% or more, or 50% or more. In some embodiments, the transmittance variance from 450-700 nm is 15% or less, 10% or less, 7.5% or less, 5% or less, or 2.5% or less. In some embodiments, the resolution is 100 lp/mm or more (which can correspond to a fiber diameter of 5.0 µm), 110 lp/mm or more (which can correspond to a fiber diameter of 4.5 µm), 125 lp/mm or more (which can correspond to a fiber diameter of 4.0 µm), 140 lp/mm or more (which can correspond to a fiber diameter of 3.5 µm), 165 lp/mm or more (which can correspond to a fiber diameter of 3.0 µm), 200 lp/mm or more (which can correspond to a fiber diameter of 2.5 μm), or 250 lp/mm or more (which can correspond to a fiber diameter of 2.0 μm). In some embodiments, the contrast value is 0.90 or more, 0.92 or more, 0.94 or more, or 0.96 or more.

EXAMPLES

Example 1

Leached fiber bundles with a glass core refractive index of 1.605, a glass cladding refractive index of 1.556, an optical fiber diameter of 4.8 um, an area ratio of 41% (without the etchable glass spacers), a bundle diameter of 0.45 mm, a bundle length of 1,000 mm, and an approximate fiber count of 7,800 were treated as follows.

Six bundles A-F in the leached state, i.e. loose fibers, were submerged in a well-mixed solution of 23 g/L of spherical silicone resin particles (approx. diameter 0.5 to 0.7 um, Momentive brand, XC99-A8808) in 200 proof ethanol (Pharmco-AAPER SIS formula A-I). The bundles were removed from the solution and the ethanol was allow to evaporate from the bundles for two hours in air. A solution of polyethylene glycol 400 (EMD Millipore Corp) with approximately 5.6 parts per thousand of dye by volume was applied to each bundle droplet-wise every 50 mm, each droplet approximately 10 to 15 μL. The dye consisted of a combination of FD&C red 40, FD&C red 3, and FD&C blue 1 that was selected to balance the resulting transmittance spectrum of the image guide. The solution was allowed to soak into the bundles for two hours, after which each bundle was covered with a sheath to produce image guides A-F.

Figure 4:
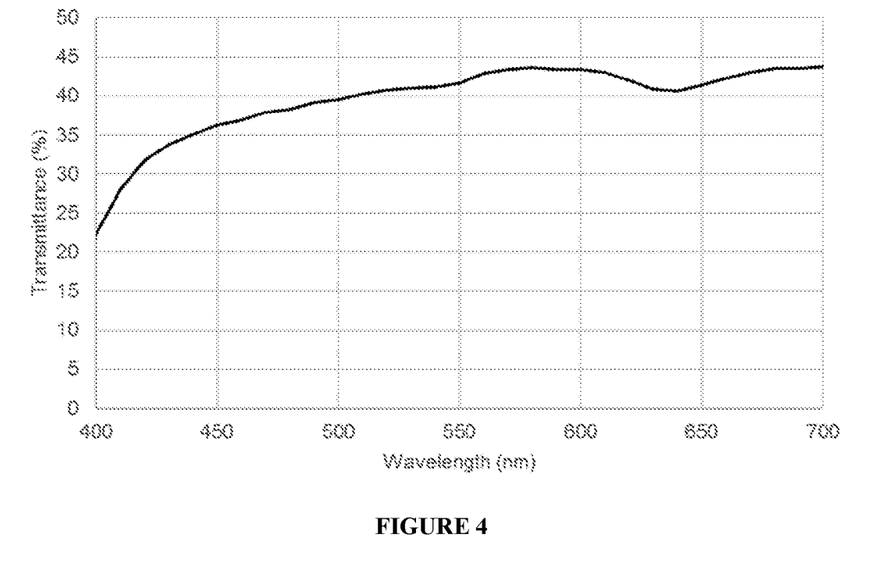
FIG. 4 shows the transmittance spectra for image guide A of the example 1.

Image guides A-F were measured for transmittance, resolution and contrast. Transmittance was determined using a transmission bench (Optronic Laboratories, Inc. model OL 750-D monochromator) arranged as detailed earlier with a 0.4 mm diameter launch aperture and using air (no image guide in light path) as a reference condition. The transmittance spectrum was collected from 400 to 700 nm at 10 nm increments. As shown in FIG. 4 for image guide A and further detailed in Table 1 for all image guides, all image guides exceeded 40% transmittance at 550 nm. All image guides also displayed a transmittance variance of less than 10% between the maximum and minimum transmittance from 450 to 700 nm.

TABLE 1

Spectral transmittance values and other derived values for image guides A-F

| Sample ID | Transmittance at 550 nm (%) | Transmittance 450 through 700 nm (%) | | |
|---|---|---|---|---|
| | | Min | Max | Difference |
| A | 41.6 | 36.3 | 43.8 | 7.5 |
| B | 42.7 | 37.4 | 45.1 | 7.7 |
| C | 41.8 | 35.9 | 44.0 | 8.1 |
| D | 41.9 | 36.4 | 44.5 | 8.1 |
| E | 42.3 | 36.6 | 44.8 | 8.2 |
| F | 42.1 | 36.1 | 44.4 | 8.3 |

The resolution of image guides A-F was determined by placing one end of each image guide in direct contact with a backlit USAF 1951 target, centered on groups 6 and 7. The opposite end of the image guide was observed with a microscope (Keyence VHX-5000) at a total magnification of approximate 200x. The transmitted image was inspected for resolvable group/element pairs. The group/element was considered resolved if the bars were visually delineated by the backlit light. There was some dependence on the orientation of the optical fiber array in the image guide relative to the target orientation on the ability to resolve the vertical and horizontal bars of the target. All bundles were observed to resolve group 6/element 5 (approximately equivalent to 102 lp/mm) or better (shown in Table 2). Some ability to resolve higher frequency group/elements was shown, but inconsistences in bar target-to-image guide fiber array orientation prevented complete resolution of group 6/element 6 (approximately equivalent to 114 lp/mm) and higher for the full set of image guides.

TABLE 2

USAF 1951 target vertical and horizontal bars resolved for image guides A-F

| | Resolved? | | | | | |
|---|---|---|---|---|---|---|
| | Group 6, Element 5 | | Group 6, Element 6 | | Group 7, Element 1 | |
| Sample ID | Horiz | Vert | Horiz | Vert | Horiz | Vert |
| A | Y | Y | N | Y | Y | Y |
| B | Y | Y | Y | Y | N | Y |
| C | Y | Y | Y | N | N | Y |
| D | Y | Y | Y | Y | N | Y |
| E | Y | Y | N | Y | Y | Y |
| F | Y | Y | Y | Y | N | N |

The contrast of image guides A-F was determined by placing one end of each image guide in direct contact with a backlit USAF 1951 target, centered on the group 4-group 5 reference indicator. The opposite end of the image guide was observed using a microscope (Keyence VHX-5000) at approximately 200x total magnification with an attached digital camera. The camera was set to a fixed aperture and a fixed exposure time. At the beginning of the session, the backlight intensity was set to avoid washing out the dynamic range of the camera and this setting was held constant for all measurements. Contrast values for all bundles were in excess of 0.92 as shown in Table 3.

TABLE 3

Average grayscale values for light and dark patches and computed contrast values for image guides A-F

| Sample ID | $g_w$ | $g_b$ | Contrast value (CV) |
|---|---|---|---|
| A | 3.5 | 162.2 | 0.96 |
| B | 6.0 | 166.0 | 0.93 |
| C | 6.0 | 162.8 | 0.93 |
| D | 3.5 | 161.3 | 0.96 |
| E | 3.9 | 162.1 | 0.95 |
| F | 4.2 | 162.5 | 0.95 |

Example 2

The following leached fiber bundles were prepared in a similar manner to the leached fiber bundles of Example 1, except that physical separation particles, a cladding extending liquid and/or a dye were used as shown in the following table.

| Sample ID | Condition | | | Transmittance at 550 nm (%) | Contrast Value |
|---|---|---|---|---|---|
| | Physical Separation Particles | Cladding Extending Liquid | Dye | | |
| Inventive Example 1 | Yes | Yes | Yes | 45 | 0.97 |
| Inventive Example 2 | Yes | Yes | No | 49 | 0.94 |
| Comparative Example 1 | No | Yes | Yes | 45 | 0.61 |
| Comparative Example 2 | No | Yes | No | 50 | 0.53 |

The table demonstrates that the image guides can be prepared having a transmittance of 25% or more at 550 nm and a contrast value of 0.90 or more.

Example 3

The following leached fiber bundles were prepared in a similar manner to the leached fiber bundles of Example 1, except the cladding extending liquid was varied as shown in the following table.

TABLE 4

Contact angle of liquid applied to non-functional-silane coated cladding glass

| Liquid applied | Contact angle of liquid on coated 8095 glass, average (degrees) | Liquid refractive index at 589 nm | Fiber bundle transmittance at 550 nm (%) |
|---|---|---|---|
| No liquid | — | — | 13.7 |
| Krytox | 15 | 1.295 | 26.8 |
| Distilled water | 82 | 1.331 | 38.5 |
| Optical fluid | — | 1.462 | 40.0 |
| PEG 400 | 46 | 1.464 | 43.8 |
| Immersion oil | 17 | 1.513 | 29.1 |

The cladding extending liquid details were as follows. Krytox was the Krytox type GPL104 lubricant (DuPont Corp), distilled water (Poland Springs brand), optical fluid was Nye OCF-446 optical coupling fluid (Nye Optical Products), PEG 400 was polyethylene glycol with average molecular mass 380 to 420 g/mol (EMD Millipore Corp), and immersion oil was Cargille Type A immersion oil (Cargille Laboratories).

Table 4 demonstrates that leached fiber bundle transmittance was improved by various cladding extending liquids. The transmittance improvement magnitude enabled by the cladding extending liquid was higher for cladding extending liquids with a refractive index near that of the cladding glass, 1.556 in this example.

The transmittance improvement magnitude enabled by the cladding extending liquid was also higher for liquids that have a high contact angle on the non-functional-silane coated glass.

The transmittance spectra for the leached fiber bundles prepared with various the cladding extending liquids are shown in FIG. 5. FIG. 5 shows that distilled water and Krytox displayed different spectral transmittance despite having similar refractive indices. Without being bound to any particular theory, the discrepancy may be caused by differences in the contact angles as shown in Table 4. For example, distilled water has a higher contact angle than Krytox GPL104 when applied to certain glass fibers. The higher contact angle possibly leads to "beading" of the cladding extending liquid on the cladding, which may in-turn promote bridging of the cladding extending liquid between adjacent fibers and may improve the effective thickness of the cladding extending liquid. A lower contact angle may result in a relatively thin film of the cladding extending liquid on the cladding and may be insufficient to regularly contain the evanescent field of the light traveling down the optical fibers. A similar effect of the contact angle can be seen by comparison of PEG 400 and immersion oil.

The invention claimed is:

1. An image guide comprising an optical fiber bundle and a protective sheath surrounding the optical fiber bundle, wherein the optical fiber bundle comprises:
   a plurality of optical fibers each having an image input end and an image output end, wherein each optical fiber comprises a core and a cladding surrounding the core,
   a plurality of particles distributed between the optical fibers to physically separate one or more of the optical fibers, and
   a cladding extending liquid located between the optical fibers.

2. The image guide of claim 1, wherein the particles have a diameter of about 0.10-0.75 μm.

3. The image guide of claim 1, wherein the particles comprise silicone resin particles talcum powder, graphite, boron nitride, PTFE powder, or a combination thereof.

4. The image guide of claim 1, wherein the particles comprise a methyl silsesquioxane.

5. The image guide of claim 1, wherein a refractive index of the cladding extending liquid is less than a refractive index of the cladding by 0.200 or less.

6. The image guide of claim 1, wherein a contact angle of the cladding extending liquid is 25-110 degrees.

7. The image guide of claim 1, wherein the cladding extending liquid comprises polyethylene glycol, cyclopropylmethylketone, diethyl phthalate, di-n-butyl sulfoxide, 3-methyl cyclohexanone, cyclobutanone dibutyl ketone, a perfluoropolyether, water with or without an additive that adjusts refractive index and/or viscosity, an optical gel, an immersion oil, or a combination thereof.

8. The image guide of claim 1, wherein the cladding extending liquid comprises a dye.

9. The image guide of claim 1, wherein a non-functional silane is applied to the exterior of the cladding.

10. The image guide of claim 1, wherein each optical fiber has a diameter of 10 μm or less.

11. The image guide of claim 1, wherein the image guide has a transmittance of 25% or more at 550 nm, a transmittance variance of 15% or less from 450-700 nm, a resolution of 100 lp/mm or more, and a contrast value of 0.90 or more.

12. The image guide of claim 1, wherein an area ratio of a cross section of the core to a cross section of the cladding is 20-60%.

13. The image guide of claim 1, wherein the physical separation particles are distributed between the optical fibers using a carrier liquid, then the carrier is evaporated, then the cladding extending liquid is applied between the optical fibers.

14. The image guide of claim 1, wherein the image guide is a component of an endoscope.

15. An image guide comprising:
   an optical fiber bundle comprising a plurality of optical fibers each having an image input end and an image output end, wherein each optical fiber comprises a core and a cladding surrounding the core, and
   a protective sheath surrounding the optical fiber bundle, wherein the image guide has a transmittance of 25% or more at 550 nm, a transmittance variance of 15% or less from 450-700 nm, a resolution of 100 lp/mm or more, and a contrast value of 0.90 or more.

16. The image guide of claim 15, wherein the transmittance is 35% or more at 550 nm.

17. The image guide of claim 15, wherein the transmittance variance is 7.5% or less from 450-700 nm.

18. The image guide of claim 15, wherein the resolution is 110 lp/mm or more.

19. The image guide of claim 15, wherein the image guide comprises a plurality of particles distributed between the optical fibers to physically separate one or more of the optical fibers.

20. The image guide of claim 19, wherein the particles have a diameter of about 0.10-0.75 μm.

21. The image guide of claim 19, wherein the particles comprise silicone resin particles talcum powder, graphite, boron nitride, PTFE powder, or a combination thereof.

22. The image guide of claim 19, wherein the particles comprise a methyl silsesquioxane.

23. The image guide of claim 15, wherein the image guide comprises a cladding extending liquid located between the optical fibers.

24. The image guide of claim 23, wherein a refractive index of the cladding extending liquid is less than a refractive index of the cladding by 0.200 or less.

25. The image guide of claim 23, wherein a contact angle of the cladding extending liquid is 25-110 degrees.

26. The image guide of claim 23, wherein the cladding extending liquid comprises polyethylene glycol, cyclopropylmethylketone, diethyl phthalate, di-n-butyl sulfoxide, 3-methyl cyclohexanone, cyclobutanone dibutyl ketone, a perfluoropolyether, water with or without an additive that adjusts refractive index and/or viscosity, an optical gel, an immersion oil, or a combination thereof.

27. The image guide of claim 23, wherein the cladding extending liquid comprises a dye.

28. The image guide of claim 15, wherein a non-functional silane is applied to the exterior of the cladding.

29. The image guide of claim 15, wherein each optical fiber has a diameter of 10 μm or less.

30. The image guide of claim 15, wherein an area ratio of a cross section of the core to a cross section of the cladding is 20-60%.

31. The image guide of claim 15, wherein the image guide comprises a plurality of particles distributed between the optical fibers to physically separate one or more of the optical fibers and a cladding extending liquid located between the optical fibers, wherein the physical separation particles are distributed between the optical fibers using a carrier liquid, then the carrier is evaporated, then the cladding extending liquid is applied between the optical fibers.

32. The image guide of claim 15, wherein the image guide is a component of an endoscope.

* * * * *